US006995924B2

(12) United States Patent
Sato

(10) Patent No.: US 6,995,924 B2
(45) Date of Patent: Feb. 7, 2006

(54) ZOOM LENS

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/936,771

(22) Filed: Sep. 9, 2004

(65) Prior Publication Data

US 2005/0057821 A1 Mar. 17, 2005

(30) Foreign Application Priority Data

Sep. 11, 2003 (JP) ............................ 2003-320118

(51) Int. Cl.
*G02B 15/14* (2006.01)

(52) U.S. Cl. ...................................... 359/689; 359/680

(58) Field of Classification Search ................ 359/689, 359/680–682

See application file for complete search history.

(56) References Cited

U.S. PATENT DOCUMENTS

| | | | | |
|---|---|---|---|---|
| 6,351,337 | B1 * | 2/2002 | Tanaka | 359/684 |
| 6,498,687 | B1 * | 12/2002 | Sekita et al. | 359/680 |
| 6,545,819 | B1 * | 4/2003 | Nanba et al. | 359/689 |
| 6,771,433 | B2 * | 8/2004 | Ohashi | 359/689 |
| 6,836,375 | B1 * | 12/2004 | Ito | 359/682 |
| 6,919,994 | B2 * | 7/2005 | Tanaka | 359/689 |
| 6,943,960 | B2 * | 9/2005 | Ori et al. | 359/684 |

FOREIGN PATENT DOCUMENTS

| | | |
|---|---|---|
| JP | 2000-284177 | 10/2000 |
| JP | 2001-296476 | 10/2001 |
| JP | 2003-35868 | 2/2003 |

* cited by examiner

*Primary Examiner*—Georgia Epps
*Assistant Examiner*—M. Hasan
(74) *Attorney, Agent, or Firm*—Arnold International; Jon W. Henry; Bruce Y. Arnold

(57) ABSTRACT

A zoom lens includes at least two lens groups that move for zooming. An object-side lens group is formed of a lens component having negative refractive power and a meniscus shape and a second lens component having positive refractive power and a meniscus shape, which may be in that order from the object side. Each of these lens components may be formed of a single lens element. Lens elements of the lens components satisfy certain conditions related to the half-field angle at the wide-angle end and the Abbe numbers of the lens elements. The zoom lens may include a third lens group, which may be stationary, with a middle lens group that moves nearer the object-side lens group and farther from the third lens group during zooming from the wide-angle end to the telephoto end. At least one surface of a lens component may be an aspheric surface.

20 Claims, 4 Drawing Sheets

ZOOM LENS

BACKGROUND OF THE INVENTION

Conventionally, zoom lenses for various cameras are formed, for example, of a three-group construction and include, in order from the object side, a first lens group having negative refractive power, a second lens group having positive refractive power, and a third lens group having positive refractive power. Zoom lenses with this construction have been widely used in order to produce a compact zoom lens with good correction of aberrations. For digital cameras and video cameras that have been widely used in recent years, as with zoom lenses for camera use in general, a small lens that enables high picture quality and low distortion is desired. Additionally, it is necessary to satisfy particular conditions due to the use of a solid state image pickup element, such as a CCD.

Recently, in these digital cameras and video cameras where a solid state image pickup element, such as a CCD, is used, the demand for a wider angle of view in the lens has become extremely strong. For example, there is a demand for a zoom lens in a thirty-five millimeter format camera to have a wide-angle focal length of approximately twenty-eight millimeters to twenty-four millimeters.

In a camera where a solid state image pickup device is used, it is possible to process an imaged picture into different pictures. This image processing, including image enlargement and cropping of a picture taken at a wider angle, enables producing an image that simulates an image taken at the telephoto end to some extent. However, it is difficult to simulate a picture taken at a wide-angle from an image taken at the telephoto end. Therefore, it is necessary to optically obtain pictures at the wide-angle end.

Japanese Laid-Open Patent Application 2003-035868, Japanese Laid-Open Patent Publication 2001-296476, and Japanese Laid-Open Patent Publication 2000-284177 disclose zoom lenses designed for satisfying the requirements discussed above. The zoom lenses described in Japanese Laid-Open Patent Application 2003-035868 are mountable on a digital camera or a video camera where a solid state image pickup device, such as a CCD, is used. These zoom lenses have a three-group construction, wherein it is possible to zoom in and out within the range of focal lengths of twenty-six to eighty millimeters in terms of a thirty-five millimeter format camera. However, in the zoom lenses described in Japanese Laid-Open Patent Application 2003-035868, the first lens group is formed of three lens components that are lens elements so that it is difficult to satisfy the demands of compactness, which are currently strong for digital cameras and video cameras. In other words, in order to satisfy the above requirements, the requirement of obtaining excellent optical performance at the wide-angle end has resulted in the acceptance of a requirement of a minimum of three lens components that are lens elements for the object-side lens group, and using only two lens components that are lens elements, which would provide desired greater compactness, has been assumed to result in an unacceptable optical performance, including unacceptable lateral color.

BRIEF SUMMARY OF THE INVENTION

The present invention relates to a zoom lens of simple construction with an object-side lens group including two lens components, which may be lens elements, with a large wide-angle of view, and with excellent correction of lateral color aberration even at the wide-angle end. The present invention further relates to such a zoom lens particularly suited for mounting in a digital camera or a video camera that uses a solid state image pickup element, such as a CCD, and that is compact while providing a large wide-angle of view.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
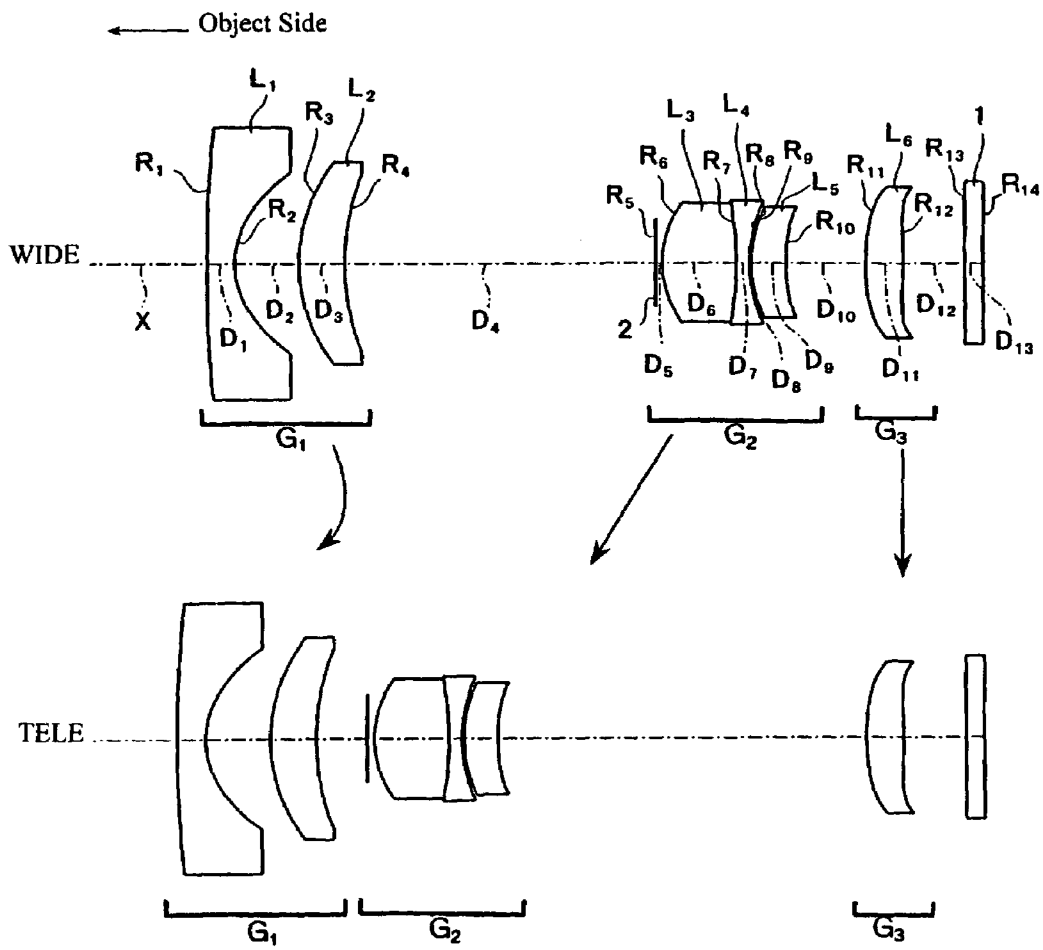
FIG. 1 shows cross-sectional views of the zoom lens according to Embodiment 1 at the wide-angle end (WIDE) and at the telephoto end (TELE)

A general description of the three-group zoom lens of the present invention that pertains to the two disclosed embodiments of the invention will first be described with reference to FIG. 1 that shows Embodiment 1. In FIG. 1, lens elements are referenced by the letter L with a subscript denoting their order from the object side of the zoom lens along the optical axis X, from $L_1$ to $L_6$. Similarly, radii of curvature of the optical surfaces are referenced by the letter R with a subscript denoting their order from the object side of the zoom lens, from $R_1$ to $R_{14}$. The on-axis surface spacings along the optical axis X of various optical surfaces are referenced by the letter D with a subscript denoting their order from the object side of the zoom lens, from $D_1$ to $D_{13}$. In the same manner, the three groups are labeled $G_1$ to $G_3$ in order from the object side of the zoom lens and the lens elements belonging to each lens group are indicated by brackets adjacent the labels $G_1$ to $G_3$.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

The top portion of FIG. 1 shows the zoom lens at the wide-angle end of the zoom range and the bottom portion of FIG. 1 shows the zoom lens at the telephoto end of the zoom range. As shown in FIG. 1, the zoom lens is a three-group zoom lens that includes, arranged along the optical axis X in order from the object side, a first lens group $G_1$ of negative refractive power, a second lens group $G_2$ of positive refractive power, and a third lens group $G_3$ of positive refractive power. The second lens group $G_2$ includes a stop 2 that operates as an aperture stop to control the amount of light that passes through the zoom lens. In FIG. 1, a horizontal arrow before the label "Object side" points in one direction in order to indicate the object side of the zoom lens. The opposite side is the image side of the zoom lens. A filter unit or cover glass 1 is on the image side of the third lens group $G_3$. The filter unit may include a low-pass filter and/or an infrared cut-off filter for controlling the light flux to an image plane (not shown) where an image pickup element, such as a CCD, may be located.

During zooming from the wide-angle end to the telephoto end, as shown in FIG. 1, the first lens group $G_1$ and the second lens group $G_2$ both move to become closer together, and the second lens group $G_2$ and the third lens group $G_3$ become farther apart. In FIG. 1, a line that is concave toward the object side extends between the positions of the first lens group $G_1$ in the upper and lower portions of FIG. 1 in order to indicate the locus of points of movement of the first lens group $G_1$, as seen in the cross-sections that include the optical axis X, during zooming between the wide-angle end and the telephoto end. Similarly, a straight line between the positions of the second lens group $G_2$ in the upper and lower portions of FIG. 1 indicates the locus of points of movement of the second lens group $G_2$ toward the object side during zooming from the wide-angle end to the telephoto end. In the same manner, a straight line between the positions of the third lens group $G_3$ in the upper and lower portions of FIG. 1 indicates the locus of points of movement of the third lens group $G_3$, which in FIG. 1 is a vertical line in order to indicate that the third lens group $G_3$ remains stationary during zooming. However, the third lens group $G_3$ may also be movable. By this relative movement of the three lens groups $G_1$, $G_2$, and $G_3$ along the optical axis X, the focal length f of the entire zoom lens can be varied, and the light flux can be condensed efficiently on an image plane.

The first lens group $G_1$ is formed of, in order from the object side, a first lens component that is a lens element $L_1$ having negative refractive power and a meniscus shape and a second lens component that is a lens element $L_2$ having positive refractive power and a meniscus shape.

Additionally, preferably the zoom lens of the present invention satisfies the following Conditions (1)–(3):

$$\tan S>0.72 \qquad \text{Condition (1)}$$

$$18.0<\nu_{d2}<22.0 \qquad \text{Condition (2)}$$

$$\Delta\nu_d>(\tan S-0.7)\cdot 32.0+18.0 \qquad \text{Condition (3)}$$

where

S is the half-field angle at the wide-angle end (i.e., the half-field angle of view at the maximum image height at the wide-angle end), $\nu_{d2}$ is the Abbe number of the second lens component, in order from the object side (namely, lens element $L_2$ of the first lens group $G_1$), and $\Delta\nu_d$ is the difference of the Abbe numbers at the d-line (587.6 nm) of the first lens component and the second lens component, in order from the object side (namely, the first lens element $L_1$ and the second lens element $L_2$).

Condition (1) assists in providing a very wide-angle zoom lens with a half-field angle of thirty-six degrees or greater at the wide-angle end while allowing lateral color aberration to be well corrected even at the wide-angle end.

By satisfying Conditions (2) and (3) in addition to Condition (1), lateral color aberration can be excellently corrected even at an extremely large wide-angle end. Specifically, by the meniscus lens components design described above and satisfying Conditions (2) and (3), the applicant has determined that the wide-angle end of the zoom range can be extended, as indicated by Condition (1), while-maintaining excellent correction of lateral color aberration even at the wide-angle end.

Additionally, preferably in the zoom lens of the present invention, the first lens group $G_1$ includes at least one aspheric surface and the aspheric equation that defines the shape of the aspheric surface is given by Equation (A) below, with the coefficients $A_i$ that are non-zero including both even and odd values of i.

$$Z=[(C\cdot Y^2)/\{1+(1-K\cdot C^2\cdot Y^2)^{1/2}\}]+\Sigma(A_i|Y^i|) \qquad \text{Equation (A)}$$

where

Z is the length (in mm) of a line drawn from a point on the aspheric lens surface at a distance Y from the optical axis to the tangential plane of the aspheric surface vertex, C is the curvature (equals 1 divided by the radius of curvature, R (in mm)), of the aspheric lens surface on the optical axis, Y is the distance (in mm) from the optical axis, K is the eccentricity, and $A_i$ is the ith aspheric coefficient, and the summation extends over i.

Conventionally, in the use of aspheric Equation (A) above, only the even numbered aspheric coefficients $A_4$, $A_6$, $A_8$, and $A_{10}$ have been made non-zero in order to achieve the desired performance for a zoom lens. Increasing the number of the non-zero aspheric terms by including non-zero coefficients of higher order than i equals 10 has proven to be unrealistic due to the optical design software and lens processing programming becoming too complex relative to computer processing capabilities.

However, in order to satisfy the demand for higher resolution lenses, by employing aspheric coefficients including the odd-order terms, because the number of parameters used to determine the aspheric shape increases, it becomes possible to determine the shape of the central region containing the optical axis of an aspheric lens surface and the peripheral region of the aspheric surface independently to some extent. Furthermore, by using a non-zero, third-order aspheric coefficient $A_3$ in order to provide a non-zero, odd-order term in Equation (A), the rate of change of curvature in the vicinity of the optical axis can be increased.

In general, in a zoom lens that has a three-group construction, because an aspheric lens element arranged within the first lens group $G_1$ has the luminous flux spread out over the center portion and the peripheral portion of the aspheric surface of the lens element, the lens element may be designed to refract the luminous flux in the peripheral portion so that image surface curvature and distortion aberration associated with the peripheral portion is favorably corrected. Additionally, the configuration of the center portion of the aspheric lens surface, which contributes to spherical aberration, may be determined largely independently so that simultaneous excellent correction of spherical aberration, distortion, and image surface curvature can be achieved with both the center and peripheral portions.

The greater the number of terms in Equation (A) above, the better the optical performance of the aspheric lens surface. However, the degree of difficulty of the design and the costs of processing and implementing the design become greater as the number of non-zero terms in Equation (A) increases. Thus, demands for better performance must be balanced against costs associated with providing such better performance. However, simply adding one term of the third-order associated with a non-zero coefficient $A_3$ (i.e., an odd-order term) to the fourth-order, sixth-order, eighth-order, and tenth-order terms (which are the terms of even-order having non-zero coefficients that are generally used in-defining an aspheric surface), enables a reasonable improvement in the correction of spherical aberration due to its contribution to the shape of the center region of the aspheric surface.

Alternately, in a zoom lens having a roughly similar construction to that described above with the first lens group $G_1$ including an aspheric surface, Equation (A) above that defines the aspheric surface shape may include a non-zero, even-order term of less than the sixteenth order and another non-zero, even-order term of the sixteenth-order or higher instead of one or more non-zero, odd-order terms. This configuration may result in improved performance as compared to using one or more additional non-zero coefficients for odd-order terms. In other words, the configuration of the center portion of the aspheric surface that includes the optical axis and the configuration of the peripheral portion of the aspheric lens surface can be determined independently to some extent, and the configuration of the peripheral region can be made suitable for favorable correction of spherical aberration due to the presence of one or more comparatively higher-order, non-zero terms. At the same time, the configuration of the center portion can be made suitable for the favorable correction of spherical aberration due to the presence of one or more comparatively low-order, non-zero terms, thereby enabling the simultaneous, favorable correction of spherical aberration, distortion, and image surface curvature, similar to the use of non-zero, odd-order terms in Equation (A) above.

Furthermore, the two alternatives described above may be used together. That is, Equation (A) above that defines the aspheric surface shape may include one or more non-zero, even-order aspheric coefficients in addition to also including one or more non-zero, odd-order coefficients.

In Embodiments 1 and 2 of the invention disclosed below, all aspheric coefficients other than $A_3$–$A_{10}$ are zero. These two embodiments will now be individually described with further reference to the drawings.

Embodiment 1

In Embodiment 1, as shown in FIG. 1, the first lens group $G_1$ is formed of, in order from the object side, a first lens element $L_1$ of negative refractive power and a meniscus shape with its object-side surface being convex and having a much greater radius of curvature (i.e., a much smaller curvature) than its concave image-side surface so that the first lens element $L_1$ is nearly a plano-concave lens element, and a second lens element $L_2$ of positive refractive power and a meniscus shape with its object-side surface being convex. Both surfaces of lens element $L_1$ are aspheric surfaces with aspheric surface shapes expressed by Equation (A) above including both even and odd-order, non-zero terms based on both even and odd aspheric coefficients being non-zero.

The second lens group $G_2$ is formed of, in order from the object side, a stop 2, a lens component formed of, in order from the object side, a third lens element $L_3$ that is a biconvex lens element with its object-side surface having a greater curvature than its image-side surface and that is joined (as by being cemented) to a fourth lens element $L_4$ that is a biconcave lens element with its image-side surface having a greater curvature than its object-side surface, and a fifth lens element $L_5$ of positive refractive power and a meniscus shape with its convex surface on the object side that forms a separate lens component of the second lens group $G_2$. Both surfaces of the fifth lens element $L_5$ are aspheric surfaces with aspheric surface shapes expressed by Equation (A) above including only even-order aspheric coefficients that are non-zero.

The third lens group $G_3$ is formed of a sixth lens element $L_6$ of positive refractive power with its object-side surface being convex. Both surfaces of lens element $L_6$ are aspheric surfaces with aspheric surface shapes expressed by Equation (A) above including both even and odd-order non-zero terms based on both even and odd aspheric coefficients being non-zero.

Embodiment 1 of the present invention is a three-group zoom lens that includes six lens elements with lens elements $L_1$, $L_5$, and $L_6$ having aspheric shapes defined as described above and that excellently corrects aberrations and enables forming a high resolution image. Additionally, the zoom lens of Embodiment 1 may be designed to have a reduced length in its retracted position.

Embodiment 1 includes the preferable feature of a lens component being present in the first lens group $G_1$ with aspheric surfaces expressed by Equation (A) above that include both even-order and odd-order aspheric coefficients that are non-zero. Additionally, Embodiment 1 includes the preferable feature that this aspheric lens component be positioned substantially far from the stop 2. Because this arrangement allows for the luminous flux passing through the aspheric surfaces of this aspheric lens component to be well spread out between the center portion and the peripheral portion of the aspheric surfaces, this design is highly effective in simultaneously excellently correcting spherical aberration, distortion aberration, and image surface curvature.

Table 1 below lists numerical values of the lens data for Embodiment 1. Table 1 lists the surface number #, in order from the object side, the radius of curvature R (in mm) of each surface on the optical axis, the on-axis surface spacing D (in mm) between surfaces, as well as the refractive index $N_d$ and the Abbe number $\nu_d$ (at the d-line of 587.6 nm) of each optical element for Embodiment 1. Listed in the bottom portion of Table 1 are the focal length f and the f-number $F_{NO}$ at the wide-angle and telephoto ends, and the maximum field angle 2ω at the wide-angle end and the telephoto end for Embodiment 1.

TABLE 1

| # | R | D | $N_d$ | $\nu_d$ |
|---|---|---|---|---|
| 1* | ∞ | 1.50 | 1.75512 | 45.6 |
| 2* | 4.8999 | 3.49 | | |
| 3 | 9.1536 | 2.50 | 1.92286 | 18.9 |
| 4 | 13.5419 | $D_4$ (variable) | | |
| 5 (stop) | ∞ | 0.40 | | |
| 6 | 5.7991 | 4.00 | 1.71300 | 53.8 |
| 7 | −17.8297 | 0.70 | 1.84666 | 23.8 |
| 8 | 8.1732 | 0.10 | | |
| 9* | 6.5615 | 1.88 | 1.68893 | 31.1 |
| 10* | 14.8262 | $D_{10}$ (variable) | | |
| 11* | 15.4501 | 2.00 | 1.58913 | 61.2 |
| 12* | −25.0078 | 3.35 | | |
| 13 | ∞ | 1.00 | 1.51680 | 64.2 |
| 14 | ∞ | | | |
| f = 3.8–13.8 mm $F_{NO}$ = 2.5–5.2 2ω = 86.4°–26.0° | | | | |

The lens surfaces with a * to the right of the surface number in Table 1 are aspheric lens surfaces, and the aspheric surface shape of these lens elements is expressed by Equation (A) above.

Table 2 below lists the values of the constant K and the coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0\times10^{-2}$.

The zoom lens of Embodiment 1 of the present invention satisfies Conditions (1)–(3) above as set forth in Table 4 below.

TABLE 4

| Condition No. | Condition | Value(s) |
|---|---|---|
| (1) | tan S > 0.72 | 0.94 (S = 43.2°) |
| (2) | $18.0 < \nu_{d2} < 22.0$ | 18.9 |
| (3) | $\Delta\nu_d > (\tan S - 0.7)\cdot 32.0 + 18.0$ | 26.7 > 25.7 |

Figure 2A:
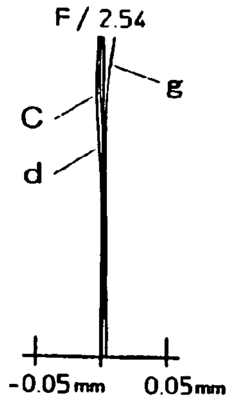
FIGS. 2A–2D show the spherical aberration, astigmatism, distortion, and lateral color, respectively, of the zoom lens according to Embodiment 1 at the wide-angle end.
Figure 2B:
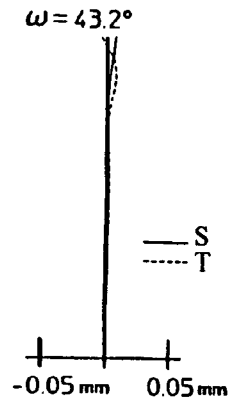
Figure 2C:
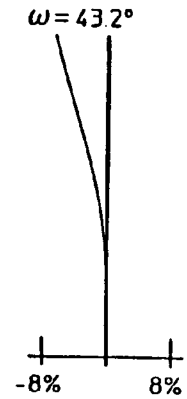
Figure 2D:
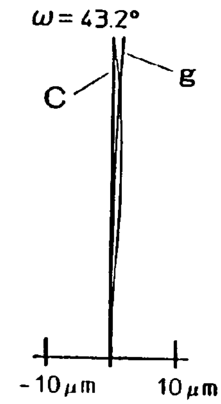
Figure 2E:
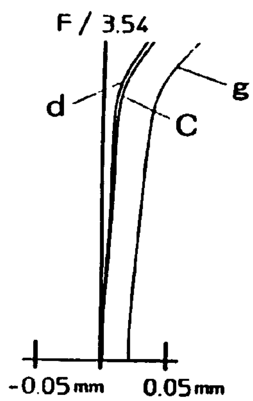
FIGS. 2E–2H show the spherical aberration, astigmatism, distortion, and lateral color, respectively, of the zoom lens according to Embodiment 1 at an intermediate position.
Figure 2F:
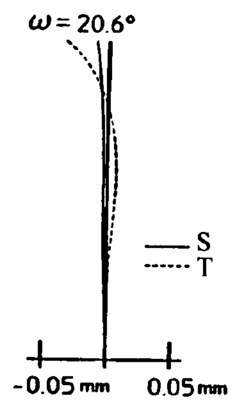
Figure 2G:
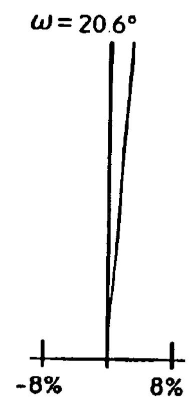
Figure 2H:
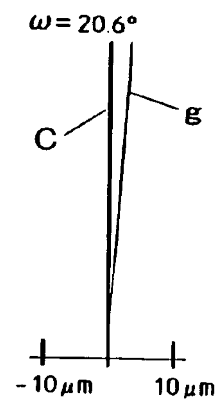
Figure 2I:
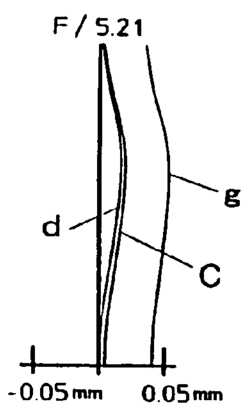
FIGS. 2I–2L show the spherical aberration, astigmatism, distortion, and lateral color, respectively, of the zoom lens according to Embodiment 1 at the telephoto end.
Figure 2J:
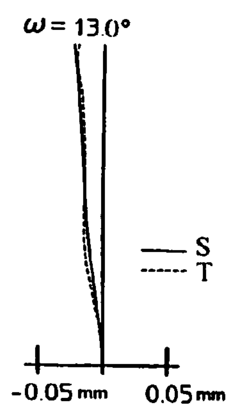
Figure 2K:
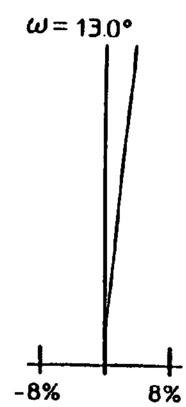
Figure 2L:
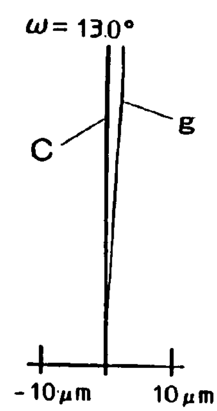

FIGS. 2A–2D show the spherical aberration, astigmatism, distortion, and lateral color, respectively, of the zoom lens of Embodiment 1 at the wide-angle end. FIGS. 2E–2H show the spherical aberration, astigmatism, distortion, and lateral color, respectively, of the zoom lens of Embodiment 1 at an intermediate position, and FIGS. 2I–2L show the spherical aberration, astigmatism, distortion, and lateral color, respectively, of the zoom lens of Embodiment 1 at the telephoto end. In FIGS. 2A, 2E, and 2I, the spherical aberration is shown for the wavelengths 587.6 nm (the d-line), 656.3 nm (the C-line), and 435.8 nm (the g-line). In the remaining figures, ω is the half-field angle. In FIGS. 2B, 2F and 2J, the astigmatism is shown for the sagittal image surface S and the tangential image surface T. In FIGS. 2C, 2G and 2K, distortion is measured at 587.6 nm (the d-line). In FIGS. 2D, 2H and 2L, the lateral color is shown for the wavelengths 656.3 nm (the C-line) and 435.8 nm (the g-line) relative to 587.6 nm (the d-line). As is apparent from these figures, the various aberrations are favorably corrected over the entire range of zoom.

Embodiment 2

Figure 3:
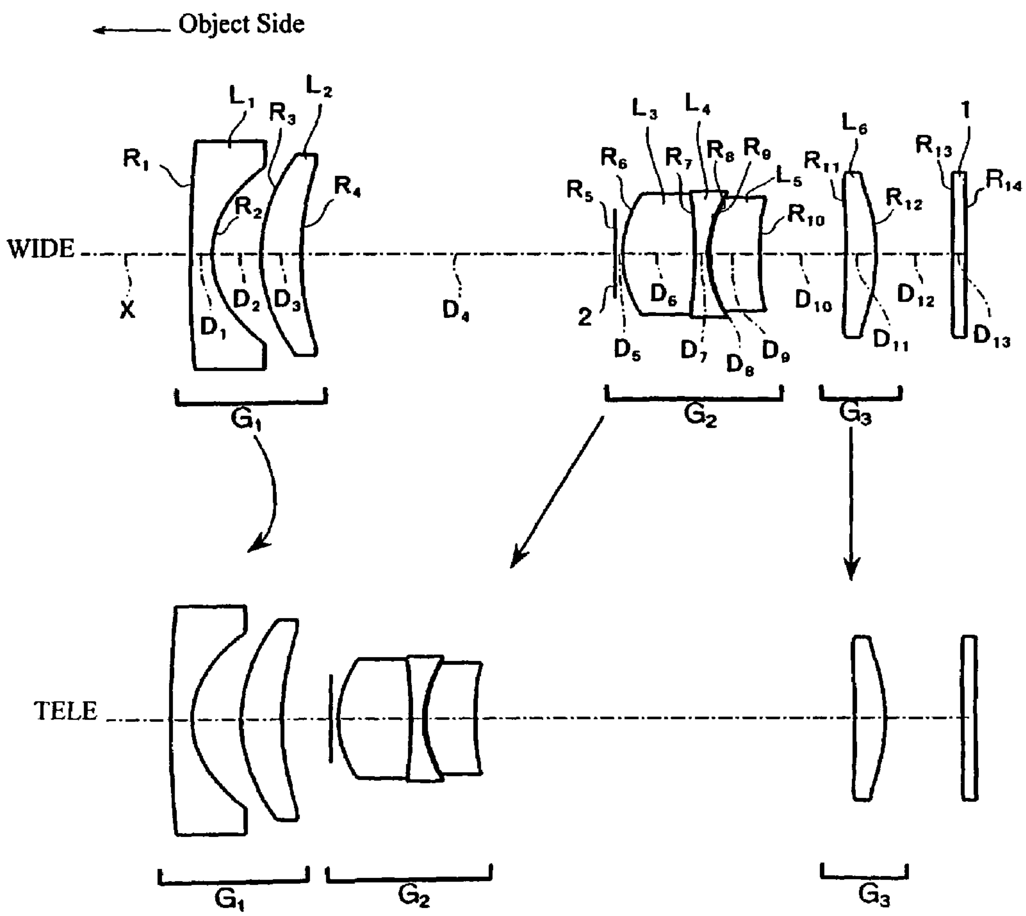
FIG. 3 shows cross-sectional views of the zoom lens according to Embodiment 2 at the wide-angle end (WIDE) and at the telephoto end (TELE);.

Embodiment 2 is shown in FIG. 3. Embodiment 2 is similar to Embodiment 1 and therefore only the differences

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.5605 | 3.5296E−4 | 1.2854E−3 | −3.8582E−4 | −1.7770E−5 | 2.6062E−5 | −4.9102E−6 | 3.9405E−7 | −1.2011E−8 |
| 2 | −1.8708 | −1.0750E−4 | 4.7249E−3 | −8.8856E−4 | −9.2004E−6 | 2.3140E−5 | 1.4295E−7 | −6.4772E−7 | 5.3449E−8 |
| 9 | −5.1774 | 0 | 2.4769E−3 | 0 | −1.0601E−4 | 0 | 1.4997E−6 | 0 | −3.3937E−7 |
| 10 | −0.4707 | 0 | 2.2884E−3 | 0 | 7.3491E−5 | 0 | −8.3428E−8 | 0 | −2.4361E−7 |
| 11 | 7.4077E−1 | 1.1440E−3 | 5.4594E−4 | −8.3878E−5 | 7.3456E−5 | 3.3985E−7 | −7.9254E−7 | −3.9032E−8 | 3.7778E−8 |
| 12 | −1.4727E−1 | 2.7941E−3 | 1.2056E−4 | 2.8572E−4 | 3.2841E−6 | −6.2274E−7 | 2.1747E−6 | 5.6464E−8 | −3.0051E−9 |

In the zoom lens of Embodiment 1, the first lens group $G_1$ and the second lens group $G_2$ move during zooming. Therefore, the on-axis spacing $D_4$ between lens groups $G_1$ and $G_2$ and the on-axis spacing $D_{10}$ between lens groups $G_2$ and $G_3$ change with zooming. Table 3 below lists the values of the focal length f, the on-axis surface spacing $D_4$, and the on-axis surface spacing $D_{10}$ at the wide-angle end (f=3.8 mm), at an intermediate zoom position (f=8.8 mm), and at the telephoto end (f=13.8 mm).

TABLE 3

| f | $D_4$ | $D_{10}$ |
|---|---|---|
| 3.8 | 16.93 | 4.30 |
| 8.8 | 5.79 | 12.20 |
| 13.8 | 2.78 | 20.00 |

between Embodiment 2 and Embodiment 1 will be explained. Embodiment 2 differs from Embodiment 1 in that in Embodiment 2, the sixth lens element $L_6$ is a meniscus lens element with its convex surface on the image side. Also, Embodiment 2 differs from Embodiment 1 in its lens element configuration by having different radii of curvature of the lens surfaces, different aspheric coefficients of the aspheric lens surfaces, some different optical element surface spacings, and two different refractive materials.

Table 5 below lists numerical values of the lens data for Embodiment 2. Table 5 lists the surface number #, in order from the object side, the radius of curvature R (in mm) of each surface on the optical axis, the on-axis surface spacing D (in mm) between surfaces, as well as the refractive index $N_d$ and the Abbe number $\nu_d$ (at the d-line of 587.6 nm) of each optical element for Embodiment 2. Listed in the bottom portion of Table 5 are the focal length f and the f-number $F_{NO}$ at the wide-angle and telephoto ends, and the maximum field angle 2ω at the wide-angle end and the telephoto end for Embodiment 2.

TABLE 5

| # | R | D | $N_d$ | $\nu_d$ |
|---|---|---|---|---|
| 1* | 5105.9700 | 1.630 | 1.80348 | 40.4 |
| 2* | 7.2341 | 3.800 | | |
| 3 | 13.0616 | 3.110 | 1.92286 | 18.9 |
| 4 | 23.7108 | $D_4$ (variable) | | |
| 5 (stop) | ∞ | 0.580 | | |
| 6 | 8.4581 | 5.670 | 1.71300 | 53.8 |
| 7 | −35.2321 | 1.020 | 1.84666 | 23.8 |
| 8 | 8.8613 | 0.155 | | |
| 9* | 8.2876 | 3.880 | 1.68893 | 31.1 |
| 10* | 37.6498 | $D_{10}$ (variable) | | |
| 11* | −99.2157 | 2.320 | 1.51680 | 64.2 |
| 12* | −14.2730 | 6.010 | | |
| 13 | ∞ | 1.00 | 1.51680 | 64.2 |
| 14 | ∞ | | | |
| f = 6.6–24.2 mm $F_{NO}$ = 2.9–5.8 2ω = 75.6°–22.2° | | | | |

The lens surfaces with a * to the right of the surface number in Table 5 are aspheric lens surfaces, and the aspheric surface shape of these lens elements is expressed by Equation (A) above.

Table 6 below lists the values of the constant K and the coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0\times10^{-2}$.

TABLE 8

| Condition No. | Condition | Value(s) |
|---|---|---|
| (1) | tan S > 0.72 | 0.78 (S = 37.8°) |
| (2) | $18.0 < \nu_{d2} < 22.0$ | 18.9 |
| (3) | $\Delta\nu_d > (\tan S - 0.7)\cdot 32.0 + 18.0$ | 21.5 > 20.4 |

Figure 4A:
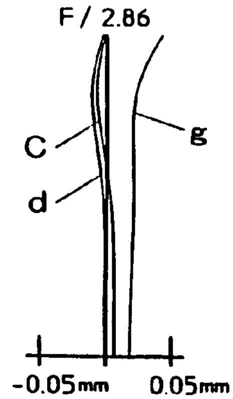
FIGS. 4A–4D show the spherical aberration, astigmatism, distortion, and lateral color, respectively, of the zoom lens according to Embodiment 2 at the wide-angle end.
Figure 4B:
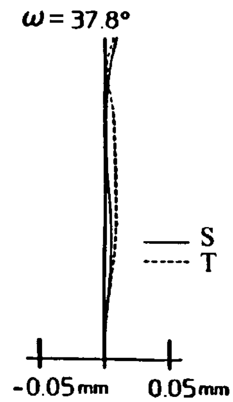
Figure 4C:
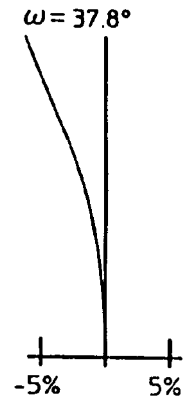
Figure 4D:
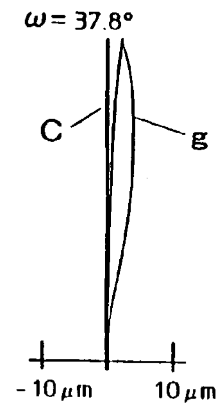
Figure 4E:
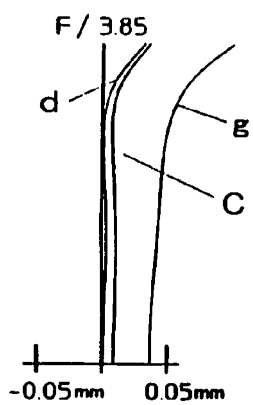
FIGS. 4E–4H show the spherical aberration, astigmatism, distortion, and lateral color, respectively, of the zoom lens according to Embodiment 2 at an intermediate position.
Figure 4F:
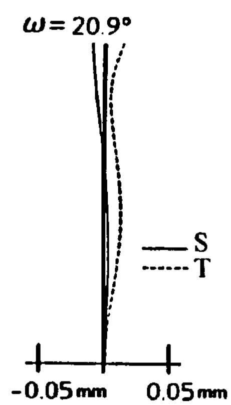
Figure 4G:
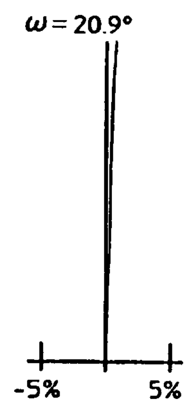
Figure 4H:
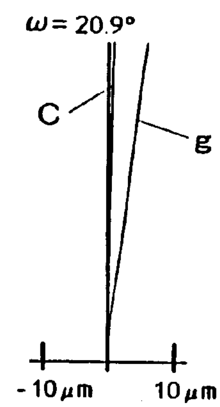
Figure 4I:
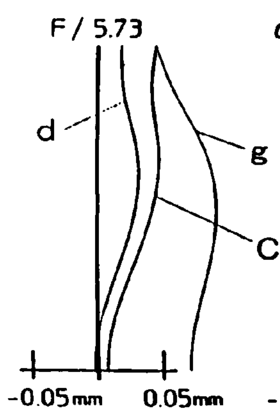
FIGS. 4I–4L show the spherical aberration, astigmatism, distortion, and lateral color, respectively, of the zoom lens according to Embodiment 2 at the telephoto end.
Figure 4J:
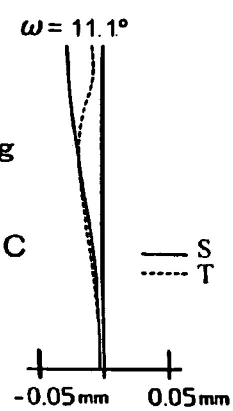
Figure 4K:
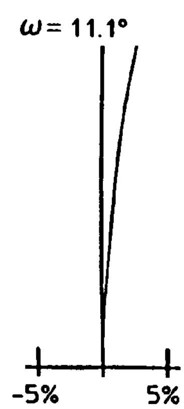
Figure 4L:
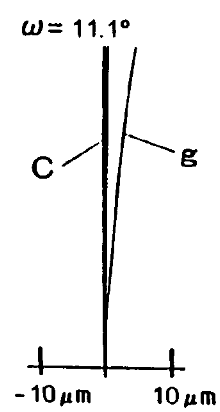

FIGS. 4A–4D show the spherical aberration, astigmatism, distortion, and lateral color, respectively, of the zoom lens of Embodiment 2 at the wide-angle end. FIGS. 4E–4H show the spherical aberration, astigmatism, distortion, and lateral color, respectively, of the zoom lens of Embodiment 2 at an intermediate position, and FIGS. 4I–4L show the spherical aberration, astigmatism, distortion, and lateral color, respectively, of the zoom lens of Embodiment 2 at the telephoto end. In FIGS. 4A, 4E, and 4I, the spherical aberration is shown for the wavelengths 587.6 nm (the d-line), 656.3 nm (the C-line), and 435.8 nm (the g-line). In the remaining figures, ω is the half-field angle. In FIGS. 4B, 4F and 4J, the astigmatism is shown for the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 656.3 nm (the C-line) and 435.8 nm (the g-line) relative to 587.6 nm (the d-line). As is apparent from these figures, the various aberrations are favorably corrected over the entire range of zoom.

The present invention is not limited to the aforementioned embodiments, as it will be obvious that various alternative implementations are possible. For instance, values such as

TABLE 6

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.5601 | 1.7943E−5 | 5.4813E−4 | −1.0746E−4 | −3.8610E−6 | 3.1247E−6 | −3.3770E−7 | 1.3013E−8 | −9.1717E−11 |
| 2 | −2.2093E−1 | −4.2011E−5 | 9.2119E−4 | −1.4507E−4 | −2.6578E−6 | 2.5815E−6 | −1.4281E−9 | −3.3589E−8 | 1.9861E−9 |
| 9 | −3.4652 | 0 | 7.8030E−4 | 0 | −1.9405E−5 | 0 | 1.4712E−7 | 0 | −1.1524E−8 |
| 10 | −4.3809E−1 | 0 | 4.9575E−4 | 0 | 5.5959E−6 | 0 | −4.3438E−8 | 0 | −8.4156E−9 |
| 11 | 1.0244 | −5.0064E−4 | 1.3167E−4 | −5.7707E−5 | 8.2414E−6 | 7.1311E−8 | −4.1044E−8 | −7.4509E−10 | 1.3686E−9 |
| 12 | 1.4509 | −1.5774E−4 | 1.0006E−4 | 2.4604E−6 | −3.5696E−7 | −2.3200E−7 | 1.2663E−7 | 3.3138E−10 | −2.8194E−10 |

In the zoom lens of Embodiment 2, the first lens group $G_1$ and the second lens group $G_2$ move during zooming. Therefore, the on-axis spacing $D_4$ between lens groups $G_1$ and $G_2$ and the on-axis spacing $D_{10}$ between lens groups $G_2$ and $G_3$ change with zooming. Table 7 below lists the values of the focal length f, the on-axis surface spacing $D_4$, and the on-axis surface spacing $D_{10}$ at the wide-angle end (f=6.6 mm), at an intermediate zoom position (f=12.5 mm), and at the telephoto end (f=24.2 mm).

TABLE 7

| f | $D_4$ | $D_{10}$ |
|---|---|---|
| 6.6 | 24.63 | 6.73 |
| 12.5 | 11.07 | 14.48 |
| 24.2 | 3.81 | 29.71 |

The zoom lens of Embodiment 2 of the present invention satisfies Conditions (1)–(3) above as set forth in Table 8 below.

the radius of curvature R of each of the lens components, the shapes of the aspheric lens surfaces, the surface spacings D, the refractive indices $N_d$, and Abbe numbers $\nu_d$ of the lens elements are not limited to those indicated in each of the aforementioned embodiments, as other values can be adopted. Additionally, the present invention may be used in other than a three-group zoom lens, including a two-group zoom lens or a zoom lens with four or more groups. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising, arranged along an optical axis in order from the object side as follows:

a first lens group;

a second lens group;

wherein at least two lens groups of the zoom lens move to perform zooming;

the first lens group consists of a first lens component having negative refractive power and a meniscus shape that includes a first lens element having negative refractive power and a meniscus shape and a second lens component having positive refractive power and a meniscus shape that includes a second lens element having positive refractive power and a meniscus shape; and the following conditions are satisfied:

$$\tan S>0.72$$

$$18.0<\nu_{d2}<22.0$$

$$\Delta\nu_d>(\tan S-0.7)\cdot 32.0+18.0$$

where

S is the half-field angle at the wide-angle end, $\nu_{d2}$ is the Abbe number of said second lens element, and $\Delta\nu_d$ is the difference of the Abbe numbers at the d-line (587.6 nm) of said first lens element and said second lens element.

2. The zoom lens of claim 1, wherein said first lens component consists of said first lens element.

3. The zoom lens of claim 2, wherein said second lens component consists of said second lens element.

4. The zoom lens of claim 1, wherein said second lens component consists of said second lens element.

5. The zoom lens of claim 1, wherein:

the first lens group is one of the lens groups that moves to perform zooming; and said first lens component is on the object side of said second lens component.

6. The zoom lens of claim 5, wherein said first lens component consists of said first lens element.

7. The zoom lens of claim 6, wherein said second lens component consists of said second lens element.

8. The zoom lens of claim 5, wherein said second lens component consists of said second lens element.

9. A zoom lens comprising, arranged along an optical axis in order from the object side as follows:

a first lens group having negative refractive power;

a second lens group having positive refractive power and including a stop for controlling the amount of light that passes through the zoom lens;

a third lens group having positive refractive power;

wherein during zooming from the wide-angle end to the telephoto end, the first lens group and the second lens group become closer together and the second lens group and the third lens group become farther apart;

the first lens group consists of a first lens component having negative refractive power and a meniscus shape that includes a first lens element having negative refractive power and a meniscus shape and a second lens component having positive refractive power and a meniscus shape that includes a second lens element having positive refractive power and a meniscus shape; and the following conditions are satisfied:

$$\tan S>0.72$$

$$18.0<\nu_{d2}<22.0$$

$$\Delta\nu_d>(\tan S-0.7)\cdot 32.0+18.0$$

where

S is the half-field angle at the wide-angle end, $\nu_{d2}$ is the Abbe number of said second lens element, and $\Delta\nu_d$ is the difference of the Abbe numbers at the d-line (587.6 nm) of said first lens element and said second lens element.

10. The zoom lens of claim 9, wherein said first lens component consists of said first-lens element.

11. The zoom lens of claim 10, wherein said second lens component consists of said second lens element.

12. The zoom lens of claim 9, wherein said second lens component consists of said second lens element.

13. The zoom lens of claim 1, wherein at least one surface of at least one of said first lens component and said second lens component is an aspheric surface.

14. The zoom lens of claim 2, wherein at least one surface of at least one of said first lens component and said second lens component is an aspheric surface.

15. The zoom lens of claim 3, wherein at least one surface of at least one of said first lens component and said second lens component is an aspheric surface.

16. The zoom lens of claim 4, wherein at least one surface of at least one of said first lens component and said second lens component is an aspheric surface.

17. The zoom lens of claim 5, wherein at least one surface of at least one of said first lens component and said second lens component is an aspheric surface.

18. The zoom lens of claim 9, wherein at least one surface of at least one of said first lens component and said second lens component is an aspheric surface.

19. The zoom lens of claim 10, wherein at least one surface of at least one of said first lens component and said second lens component is an aspheric surface.

20. The zoom lens of claim 11, wherein at least one surface of at least one of said first lens component and said second lens component is an aspheric surface.

* * * * *